US008277195B2

(12) United States Patent
Box et al.

(10) Patent No.: US 8,277,195 B2

(45) Date of Patent: Oct. 2, 2012

(54) COATED TURBINE COMPONENT AND METHOD OF COATING A TURBINE COMPONENT

(75) Inventors: Paul Box, Lincoln (GB); Mick Whitehurst, Lincoln (GB)

(73) Assignee: Siemens Aktiengesellschaft, München (DE)

( * ) Notice: Subject to any disclaimer, the term of this patent is extended or adjusted under 35 U.S.C. 154(b) by 789 days.

(21) Appl. No.: 12/308,002

(22) PCT Filed: Jun. 8, 2006

(86) PCT No.: PCT/EP2006/005470

§ 371 (c)(1),
(2), (4) Date: Dec. 4, 2008

(87) PCT Pub. No.: WO2007/140805

PCT Pub. Date: Dec. 13, 2007

(65) Prior Publication Data

US 2009/0263237 A1 Oct. 22, 2009

(51) Int. Cl.

| | |
|---|---|
| ***B63H 1/26*** | (2006.01) |
| ***B63H 7/02*** | (2006.01) |
| ***B64C 27/46*** | (2006.01) |
| ***B64C 11/16*** | (2006.01) |
| ***F03B 3/12*** | (2006.01) |
| ***F03B 7/00*** | (2006.01) |
| ***F01D 5/14*** | (2006.01) |
| ***F03D 11/02*** | (2006.01) |
| ***F04D 29/38*** | (2006.01) |

(52) U.S. Cl. ............ 416/241 R; 416/241 A; 416/241 B

(58) Field of Classification Search ........................ None
See application file for complete search history.

(56) References Cited

U.S. PATENT DOCUMENTS

| | | | | |
|---|---|---|---|---|
| 6,129,991 | A | 10/2000 | Warnes et al. | |
| 6,139,976 | A * | 10/2000 | Czech et al. | 428/610 |
| 6,270,318 | B1 | 8/2001 | Shah et al. | |
| 6,283,715 | B1 * | 9/2001 | Nagaraj et al. | 416/241 R |
| 6,296,447 | B1 | 10/2001 | Rigney et al. | |
| 6,435,826 | B1 | 8/2002 | Allen et al. | |
| 6,435,830 | B1 * | 8/2002 | Allen et al. | 416/193 A |
| 6,444,332 | B1 * | 9/2002 | Bettridge | 428/630 |
| 6,635,362 | B2 * | 10/2003 | Zheng | 428/678 |
| 6,773,817 | B1 | 8/2004 | Sagel et al. | |

FOREIGN PATENT DOCUMENTS

| | | | |
|---|---|---|---|
| DE | 198 59 477 | A1 | 6/2000 |
| GB | 2401117 | A * | 11/2004 |
| RU | 2218447 | C2 | 12/2003 |
| WO | WO 2005/031038 | A1 | 4/2005 |

OTHER PUBLICATIONS

Definition of passage—http://www.merriam-webster.com/dictionary/passage.*
Definition of passage—http://www.merriam-webster.com/dictionary/passage (date unknown).*

* cited by examiner

*Primary Examiner* — Julio J Maldonado
*Assistant Examiner* — Shantanu C Pathak

(57) ABSTRACT

Turbine components with different types of coatings on different parts thereof are described. The coatings are chosen such that they are especially adapted to the thermal and corrosive conditions being present on the parts of the component during use. A method to coat a turbine component is also described.

13 Claims, 9 Drawing Sheets

COATED TURBINE COMPONENT AND METHOD OF COATING A TURBINE COMPONENT

CROSS REFERENCE TO RELATED APPLICATIONS

This application is the US National Stage of International Application No. PCT/EP2006/005470 filed Jun. 8, 2006 and claims the benefit thereof.

FIELD OF INVENTION

The invention relates to turbine components and to methods of coating a turbine component.

BACKGROUND OF INVENTION

Components of gas turbines are operated in a highly aggressive environment which can cause damage to the component in service. The environmental damage may occur in various forms in the hot combustion gas environment, such as particle erosion, different types of corrosion and oxidation, and complex combinations of these damage modes. The rate of environmental damage can be reduced by the use of protective layers.

For example it is known that chromium provides excellent protection against so called type I and type II hot corrosion. In this regard, diffusion coatings produced by the diffusion of chromium and aluminium into the alloy substrate have long been used to provide this protection. MCrAlY overlay coatings (where M is Ni or Co or a combination of the two) have been applied as an alternative to diffusion coatings at higher temperatures to protect against oxidation. Diffused chromium alone is known to provide excellent protection against relatively low temperature type II hot corrosion, and further to be strain tolerant.

Recent developments have shown that it is favourable to provide different types of coatings on different parts of a component. The coatings are chosen such that they are especially adapted to the thermal and corrosive conditions being present on the parts of the component during use.

U.S. Pat. No. 6,296,447 B1 discloses a gas turbine component with a location-dependent protective coating. The component is a turbine blade with a root, a neck, a platform, and an airfoil extending from the platform, having an outer and an inner surface defining cooling passages therethrough. A first coating is provided on at least a portion of the platform, a second coating is provided on the outer surface of the airfoil and a third coating is provided on the inner surface of the airfoil. The first coating differs in its composition from the second coating and the second coating differs in its composition from the third coating.

SUMMARY OF INVENTION

However, the various types of environmental damage are still observed, often necessitating premature replacement or repair of components after service exposure. As a result there is a need for an improved approach to the protection of in particular gas turbine components such as turbine blades and vanes.

Accordingly it is an object of the present invention to provide a turbine component with an improved heat and corrosion resistance and to provide a method of coating a turbine component.

A first aspect of the invention provides a turbine component with a root, a neck, a platform and an airfoil having an outer surface and an inner surface defining cooling passages therethrough, wherein at least a first coating is provided on the root.

According to one embodiment a second coating may be provided on the neck. In this case the composition of the first coating should be different from the second coating.

Further it is possible to provide the second coating also on the outer surface of the airfoil and on at least a part of the platform and to provide additionally a third coating on the inner surface of the airfoil. In this case the first, second and third coating have different compositions.

The first coating which can comprise Cr which can be diffused into the component applying known methods like pack cementation or chemical vapour deposition (CVD).

Experiments have shown that good protection properties can be obtained if the first coating is a layer which is 5 to 25 μm thick and/or comprises 15 to 30 weight-% Cr.

The second coating can comprise MCrAlY, wherein M can be Co or Ni or a combination of both. Further elements such as Re, Si, Hf and/or Y can be included in the coating.

A preferred composition of the coating is 30 to 70 weight-% Ni, 30 to 50 weight-% Co, 15 to 25 weight-% Cr, 5 to 15 weight-% Al and up to 1 weight-% Y.

Different thermal spray techniques such as vacuum plasma spraying (VPS), low pressure plasma spraying (LPPS), high velocity ox-fuel spraying (HVOF), cold gas spraying (CGS) or electroplating can be applied.

The second coating can further have one of the following compositions:

30 weight-% Ni, 28 weight-% Cr, 8 weight-% Al, 0.6 weight-% Y, 0.7 weight-% Si, Co balance;

28 weight-% Ni, 24 weight-% Cr, 10 weight-% Al, 0.6 weight-% Y and Co balance;

23 weight-% Cr, 10 weight-% Co, 12 weight-% Al, 0.6 weight-% Y, 3.0 weight-% Re, Ni balance;

21 weight-% Cr, 12 weight-% Co, 11 weight-% Al, 0.4 weight-% Y and 2.0 weight-% Re, Ni balance;

17 weight-% Cr, 25 weight-% Co, 10 weight-% Al, 0.4 weight-% Y and 1.5 weight-% Re, Ni balance.

The third coating can comprise Cr and Al. Preferably the coating is a Al modified Cr coating which can be provided by diffusion of Al into a chromized surface applying known methods such as CVD and ATP. It was found that a composition of the third coating in an outer beta layer of between 15 to 30 weight-% Al and 5 to 15 weight-% Cr shows excellent protection properties.

Alternatively, a second coating can be provided on the inner and on the outer surface of the airfoil and on at least a part of the platform, and a third coating may be provided on the neck. In this case the first, the second and the third coating are different in their compositions.

The first coating, which may comprise Cr can be diffused into the component by known methods like pack cementation or chemical vapour deposition (CVD). Experiments have shown that good protection properties can be obtained if the first coating is a layer which is 5 to 25 μm thick and/or comprises 15 to 30 weight-% Cr.

According to one embodiment the second coating can comprise Cr and Al., Preferably the coating is a Al modified Cr coating which can be provided by diffusion of Al into a chromized surface using known methods such as CVD and ATP. It was found that a composition of the third coating in an outer beta layer of between 15 to 30 weight-% Al and 5 to 15 weight-% Cr shows excellent protection properties.

The third coating may comprise MCrAlY, wherein M can be Co or Ni or a combination of both. Further elements such as Re, Si, Hf and/or Y can be included in the coating. A preferred composition of the coating is 30 to 70 weight-% Ni, 30 to 50 weight-% Co, 15 to 25 weight-% Cr, 5 to 15 weight-% Al and up to 1 weight-% Y. Different thermal spray techniques such as vacuum plasma spraying (VPS), low pressure plasma spraying (LPPS), high velocity ox-fuel spraying (HVOF), cold gas spraying (CGS) or by electroplating can be applied.

The third coating can further have one of the following compositions:

30 weight-% Ni, 28 weight-% Cr, 8 weight-% Al, 0.6 weight-% Y, 0.7 weight-% Si, Co balance;

28 weight-% Ni, 24 weight-% Cr, 10 weight-% Al, 0.6 weight-% Y and Co balance;

23 weight-% Cr, 10 weight-% Co, 12 weight-% Al, 0.6 weight-% Y, 3.0 weight-% Re, Ni balance;

21 weight-% Cr, 12 weight-% Co, 11 weight-% Al, 0.4 weight-% Y and 2.0 weight-% Re, Ni balance;

17 weight-% Cr, 25 weight-% Co, 10 weight-% Al, 0.4 weight-% Y and 1.5 weight-% Re, Ni balance.

Preferably the part of the platform to be coated is the top surface and/or the side face.

According to a further embodiment of the first aspect the first coating can also be provided on the neck and on the inner surface of the airfoil.

A second coating can be provided on the outer surface of the airfoil and on the top face and/or the side face of the platform, the first and the second coating being different in their composition.

Also a third coating can be provided on top of the second coating on the outer surface of the airfoil and on the top face and/or the side face of the platform. In this case the first, the second and the third coating are different in their composition.

The first coating, which may comprise Cr can be diffused into the component by known methods like pack cementation or chemical vapour deposition (CVD). Experiments have shown that good protection properties can be obtained if the first coating is a layer which is 5 to 25 μm thick and/or comprises 15 to 30 weight-% Cr.

The second coating may comprise MCrAlY, wherein M can be Co or Ni or a combination of both. Further elements such as Re, Si, Hf and/or Y can be included in the coating. A preferred composition of the coating is 30 to 70 weight-% Ni, 30 to 50 weight-% Co, 15 to 25 weight-% Cr, 5 to 15 weight-% Al and up to 1 weight-% Y. Different thermal spray techniques such as vacuum plasma spraying (VPS), low pressure plasma spraying (LPPS), high velocity ox-fuel spraying (HVOF), cold gas spraying (CGS) or by electroplating can be applied.

The second coating can further have one of the following compositions:

30 weight-% Ni, 28 weight-% Cr, 8 weight-% Al, 0.6 weight-% Y, 0.7 weight-% Si, Co balance;

28 weight-% Ni, 24 weight-% Cr, 10 weight-% Al, 0.6 weight-% Y and Co balance;

23 weight-% Cr, 10 weight-% Co, 12 weight-% Al, 0.6 weight-% Y, 3.0 weight-% Re, Ni balance;

21 weight-% Cr, 12 weight-% Co, 11 weight-% Al, 0.4 weight-% Y and 2.0 weight-% Re, Ni balance;

17 weight-% Cr, 25 weight-% Co, 10 weight-% Al, 0.4 weight-% Y and 1.5 weight-% Re, Ni balance.

Further the third coating can comprise Al. Preferably the coating is overaluminised using known methods such as CVD and ATP. Good protection properties were found if the outer surface of the second coating had an Al content of between 15 to 30 weight-%.

Experiments have shown that good protection properties are achieved if none of the coatings comprises Pt.

The turbine component can consist of a super alloy, e.g. MarM247, IN6203 or CMSX4 and it can be provided by conventional or directionally solidified casting techniques.

According to one preferred embodiment the turbine component is a turbine blade.

According to a second aspect the object is also solved by a turbine component with a root, a neck, a platform and an airfoil having an outer surface and an inner surface defining cooling passages therethrough, wherein the inner surface of the airfoil is provided with a first coating and the outer surface of the airfoil is provided with a second coating, the first an the second coating having different compositions.

According to one embodiment of the second aspect the second coating is a MCrAlY overlay coating (M representing combinations of Ni, Co and/or Fe).

The second coating can contain 10-40 weight-% Cr, 5-35 weight-% Al, 0-2 weight-% Y, 0-7 weight-% Si, 0-2 weight-% Hf, balance primarily Ni and/or Co with all other elemental additions comprising <20 weight-% of the total. A composition of the second coating with 20-40 weight-% Cr, 5-20 weight-% Al, 0-1 weight-% Y, 0-2 weight-% Si, 0-1 weight-% Hf, balance primarily Ni and/or Co with all other elemental additions comprising <20 weight-% of the total is also possible. Preferably the second coating contains 25-40 weight-% Cr, 5-15 weight-% Al, 0-0.8 weight-% Y, 0-0.5 weight-% Si, 0-0.4 weight-% Hf; balance primarily Ni and/or Co with all other elemental additions comprising <20 weight-% of the total.

According to a third aspect of the invention the above object is also solved by a turbine component with a root, a neck, a platform and an airfoil having an outer surface and an inner surface defining cooling passages therethrough, wherein neck is provided with a first coating.

Further, according to a forth aspect the object is solved by a turbine component with a root, a neck, a platform and an airfoil having an outer surface and an inner surface defining cooling passages therethrough, wherein the neck is provided with a first coating and the bottom of the platform is provided with a second coatings, the first an the second coating having different compositions.

Still further, according to a fifth aspect of the invention the object is solved by a turbine comprising a first stage of blades and vanes and a second stage of vanes and blades, wherein the blades of the first stage are turbine components and the blades of the second stage are turbine blade components according to the dependent claims.

Finally according to a sixth aspect of the invention this object is solved by a method of coating a turbine component, with a root, a neck, a platform and an airfoil having an outer surface and an inner surface defining cooling passages therethrough, which comprises the following steps. A first coating is applied on all outer and inner surfaces of the component. Then a second coating is applied on a first portion of the component which is already coated with the first coating. Finally a third coating is applied on a second portion of the coated component. The first, the second and the third coating have different compositions.

In other words the main principle of the present method is to coat the component as a whole with a first coating and to then apply on selected portions of the component further coatings to improve the thermal resistance, corrosion resistance etc. in the respective portions of the component. In this way a component may be designed, which by the provision of the different coatings has properties that meet the requirements in use.

It is also possible to mask certain parts of the component especially the parts which shall be coated afterwards with a MCrAlY coating prior to the application of the first coating using masking elements and techniques know in the art. In this case the masked parts of the component will not be coated with the first coating.

According to one embodiment the first coating is diffused into the component. This diffusion may be achieved by any suitable method like pack cementation or chemical vapour deposition (CVD). It is in particular possible to diffuse Cr into the compound which is known to provide an excellent protection against hot corrosion. Experiments have shown that good protection properties can be obtained if the first coating is a layer which is 5 to 25 μm thick and/or comprises 15 to 30 weight-% Cr.

Preferably, the selected regions are regions which are not subject to high physical stress in the subsequent use of the component. This restriction ensures, that those regions of the component that are subject to higher physical stress are coated with the chromium diffusion coating alone, which is strain tolerant, and that the strain tolerance of this coating is not degraded by the application of further coatings.

In a preferred embodiment of the sixth aspect the first portion comprises the neck, the outer surface of the airfoil and at least a part of the platform and the second portion is the inner surface of the airfoil.

The second coating may be an overlay coating, that can comprise MCrAlY, wherein M can be Co or Ni or a combination of both. Further elements such as Re, Si, Hf and/or Y can be included in the coating. A preferred composition of the coating is 30 to 70 weight-% Ni, 30 to 50 weight-% Co, 15 to 25 weight-% Cr, 5 to 15 weight-% Al and up to 1 weight-% Y. Different thermal spray techniques such as vacuum plasma spraying (VPS), low pressure plasma spraying (LPPS), high velocity ox-fuel spraying (HVOF), cold gas spraying (CGS) or electroplating can be applied.

The second coating can also have one of the following compositions:

30 weight-% Ni, 28 weight-% Cr, 8 weight-% Al, 0.6 weight-% Y, 0.7 weight-% Si, Co balance;

28 weight-% Ni, 24 weight-% Cr, 10 weight-% Al, 0.6 weight-% Y and Co balance;

23 weight-% Cr, 10 weight-% Co, 12 weight-% Al, 0.6 weight-% Y, 3.0 weight-% Re, Ni balance;

21 weight-% Cr, 12 weight-% Co, 11 weight-% Al, 0.4 weight-% Y and 2.0 weight-% Re, Ni balance;

17 weight-% Cr, 25 weight-% Co, 10 weight-% Al, 0.4 weight-% Y and 1.5 weight-% Re, Ni balance.

According to a further embodiment it is possible to apply the second and/or third coating, which can comprise Al, by diffusion, e.g. by CVD or above the pack (ATP).

In still another preferred embodiment of the sixth aspect the first portion comprises the inner and the outer surface of the airfoil and at least a part of the platform and the second portion comprises the neck of the component.

As in the first preferred embodiment it is possible to diffuse the second coating, which can comprise Al, into the component by CVD or ATP.

The third coating may comprise MCrAlY, wherein M can be Co or Ni or a combination of both. Further elements such as Re, Si, Hf and/or Y can be included in the coating. A preferred composition of the coating is 30 to 70 weight-% Ni, 30 to 50 weight-% Co, 15 to 25 weight-% Cr, 5 to 15 weight-% Al and up to 1 weight-% Y. Different thermal spray techniques such as vacuum plasma spraying (VPS), low pressure plasma spraying (LPPS), high velocity ox-fuel spraying (HVOF), cold gas spraying (CGS) or by electroplating can be applied.

The third coating can also have one of the following compositions:

30 weight-% Ni, 28 weight-% Cr, 8 weight-% Al, 0.6 weight-% Y, 0.7 weight-% Si, Co balance;

28 weight-% Ni, 24 weight-% Cr, 10 weight-% Al, 0.6 weight-% Y and Co balance;

23 weight-% Cr, 10 weight-% Co, 12 weight-% Al, 0.6 weight-% Y, 3.0 weight-% Re, Ni balance;

21 weight-% Cr, 12 weight-% Co, 11 weight-% Al, 0.4 weight-% Y and 2.0 weight-% Re, Ni balance;

17 weight-% Cr, 25 weight-% Co, 10 weight-% Al, 0.4 weight-% Y and 1.5 weight-% Re, Ni balance.

Preferred parts of the platform to be coated are the top surface and/or the side face.

Tests have shown that good protection results can be obtained, if the coatings do not comprise Pt.

The method can be used to coat turbine blades which may consist of a super alloy, e.g. MarM247, IN6203 or CMSX4.

Preferably the turbine component is a turbine blade.

BRIEF DESCRIPTION OF THE DRAWINGS

The invention will now be described, by way of example, with reference to the accompanying drawings, in which.

DETAILED DESCRIPTION OF INVENTION

Figure 1:
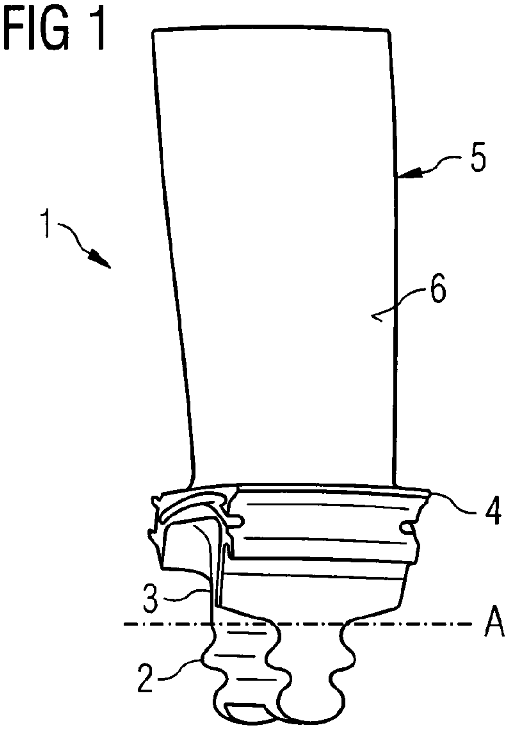
FIG. 1 is a perspective view of a turbine blade according to a first embodiment of the present invention.
Figure 2:
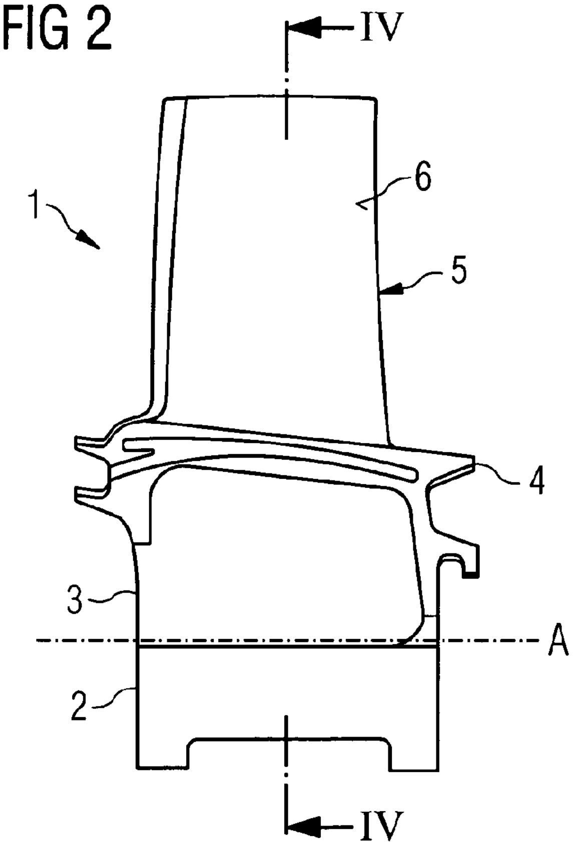
FIG. 2 is a side view of the turbine blade shown in FIG. 1.
Figure 3:
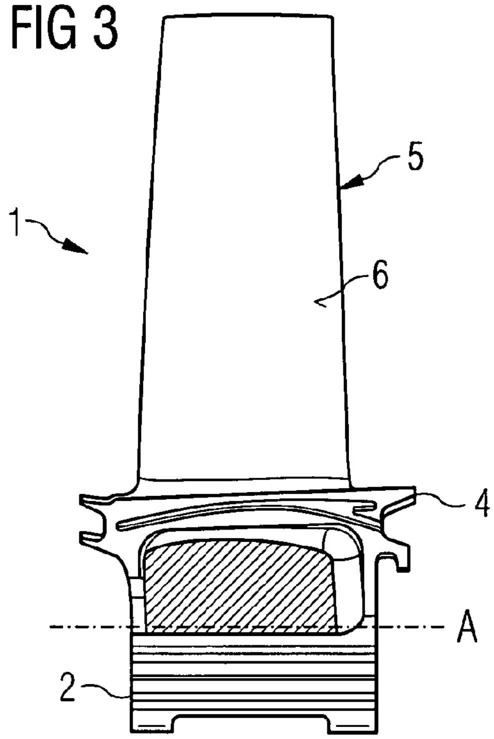
FIG. 3 is a longitudinal sectional view of the turbine blade shown in FIG. 2.
Figure 4:
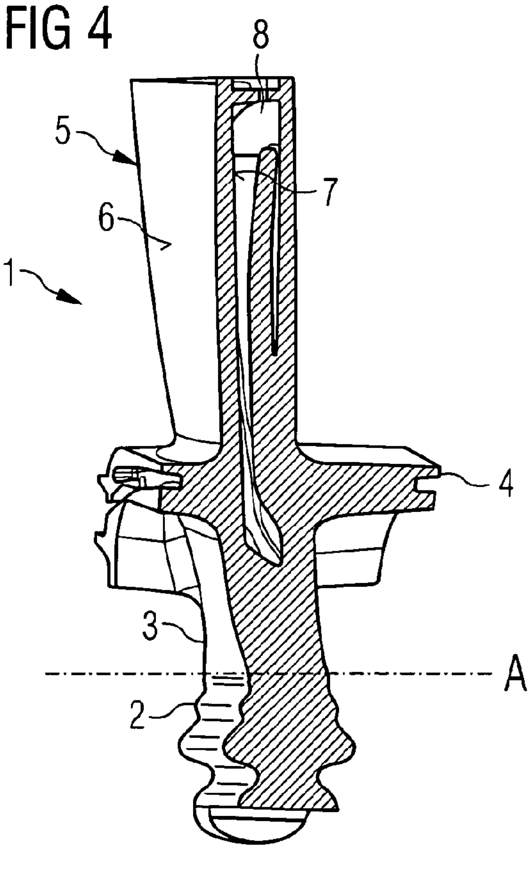
FIG. 4 is a cross sectional view taken along line IV-IV in FIG. 2.

FIGS. 1 to 5 show a turbine blade 1 having a root 2, a neck 3, a platform 4 and an airfoil 5 with an outer surface 6 and an inner surface 7. In this case the turbine blade 1 consists of the superalloy MarM247 and is provided by directionally solidified casting techniques. The root 2 is connected with the neck 3 which carries the platform 4. The airfoil 5 extends from the platform 4. Inside the airfoil 5 the inner surface 7 defines at least one cooling passage 8 which is depicted in FIG. 4.

A first diffusion Cr coating is present on all outer and inner surfaces of the blade 1. It is about 5 to 25 μm thick and comprises of 15 to 30 weight-% Cr.

A second MCrAlY coating is provided on top of the first coating in restricted parts of the blade 1 only, namely on the neck 3, the outer surface 6 of the airfoil 5 and on the whole of the platform 4. The coating has a composition of 30 to 70 weight-% Ni, 30 to 50 weight-% Co, 15 to 25 weight-% Cr, 5 to 15 weight-% Al and up to 1 weight-% Y.

The second MCrAlY coating can also have the following composition: 10 to 40 weight-% Cr, 5 to 35 weight-% Al, 0 to 2 weight-% Y, 0 to 7 weight-% Si, 0 to 2 weight-% Hf and balance primarily Ni and/or Co with all other elemental additions comprising <20 weight-% of the total, preferably 20 to 40 weight-% Cr, 5 to 20 Al, 0 to 1 weight-% Y, 0 to 2 weight-% Si, 0 to 1 weight-% Hf and balance primarily Ni and/or Co with all other elemental additions comprising <20 weight-% of the total, more preferably 25 to 40 weight-% Cr, 5 to 15 weight-% Al, 0 to 0.8 weight-% Y, 0 to 0.5 weight-% Si, 0 to 0.4 weight-% Hf and balance primarily Ni and/or Co with all other elemental additions comprising <20 weight-% of the total.

The border between the portion of the blade 1 which is provided with the second coating and the root 2 which does not carry the coating is indicated by the dotted line A.

A third coating covers the first coating on the inner surface 7. The third coating is a Al modified Cr coating which has in an outer beta layer a composition of 15 to 30 weight-% Al and 5 to 15 weight-% Cr.

Figure 5:
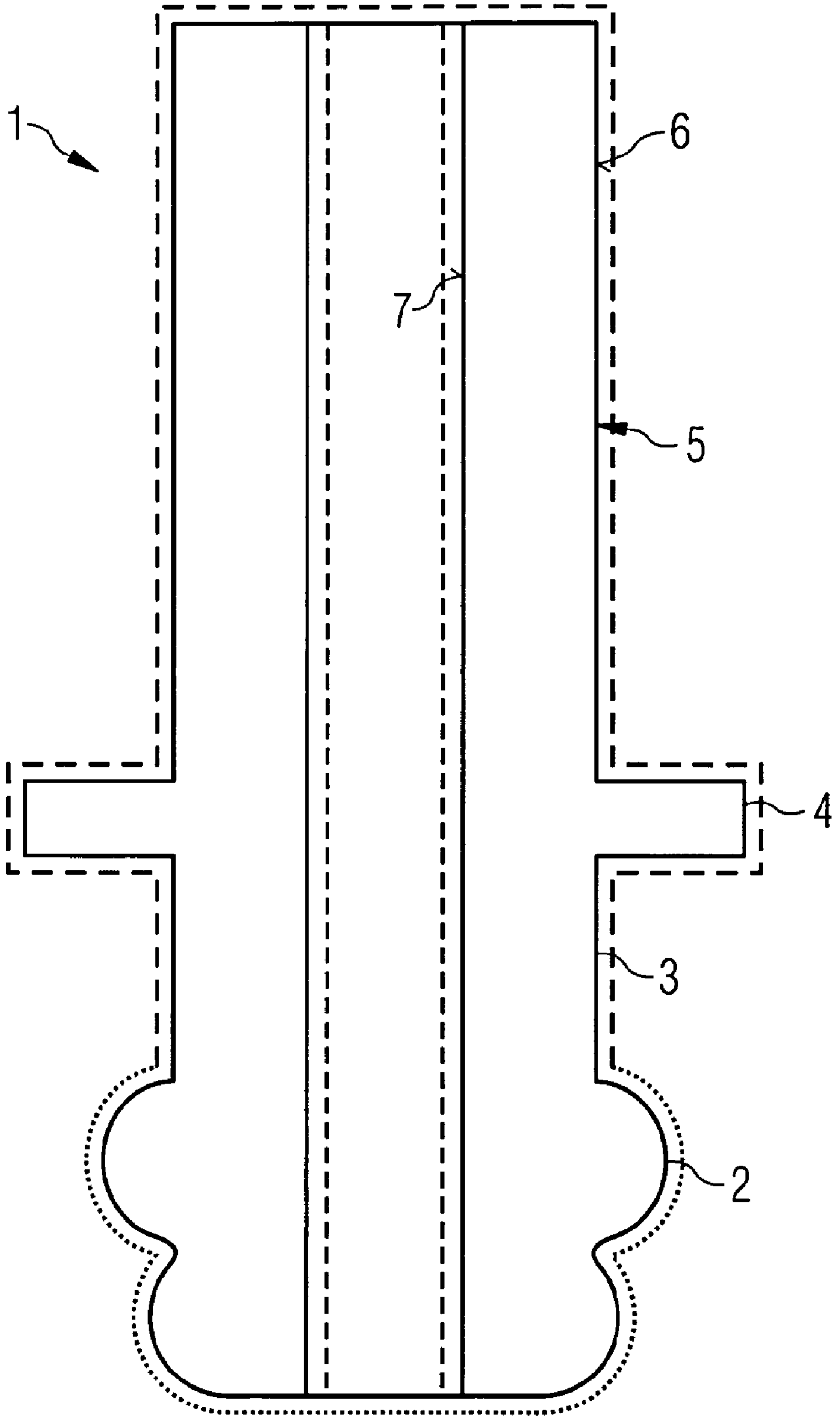
FIG. 5 is schematic view of the turbine blade shown in FIG. 1.
Figure 6:
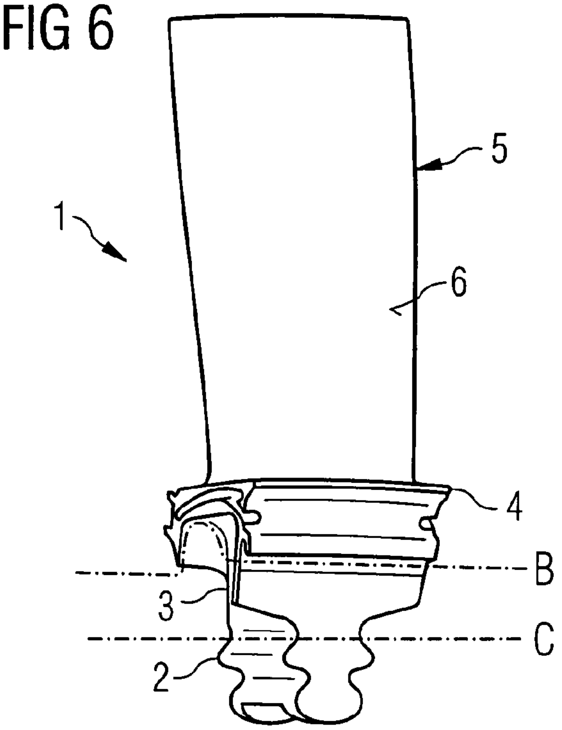
FIG. 6 is a perspective view of a turbine blade according to a second embodiment of the present invention.
Figure 7:
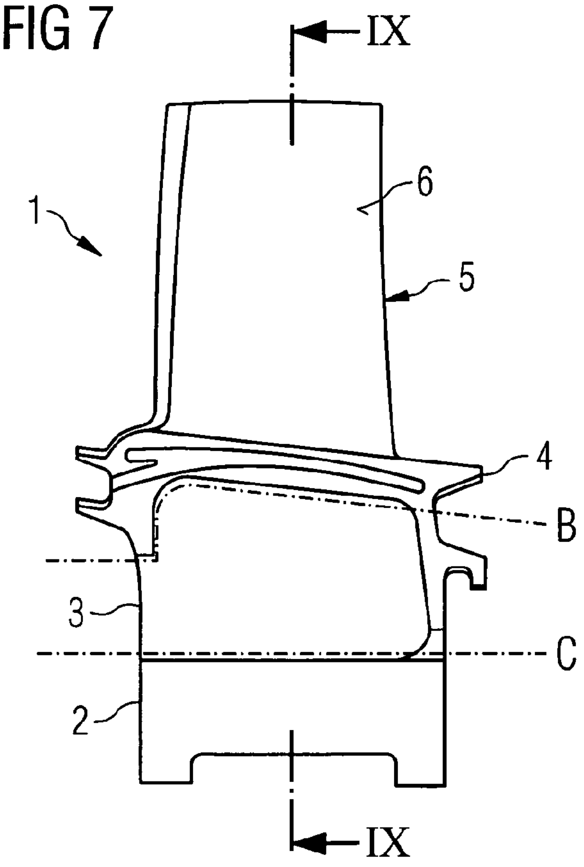
FIG. 7 is a side view of the turbine blade shown in FIG. 6.
Figure 8:
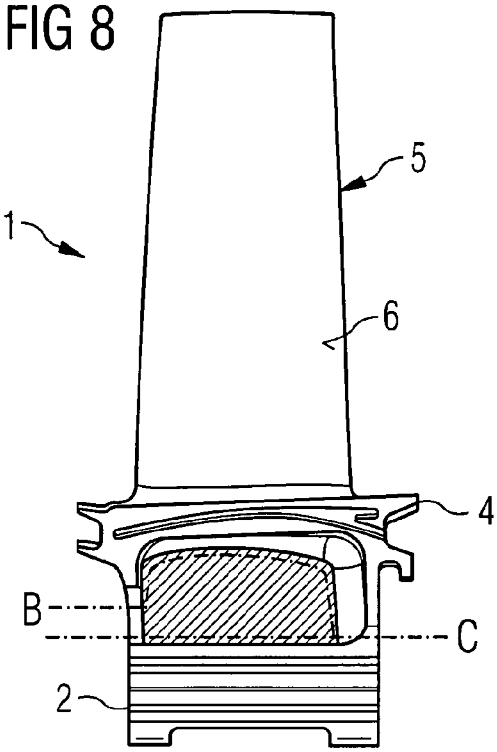
FIG. 8 is a longitudinal sectional view of the turbine blade shown in FIG. 7
Figure 9:
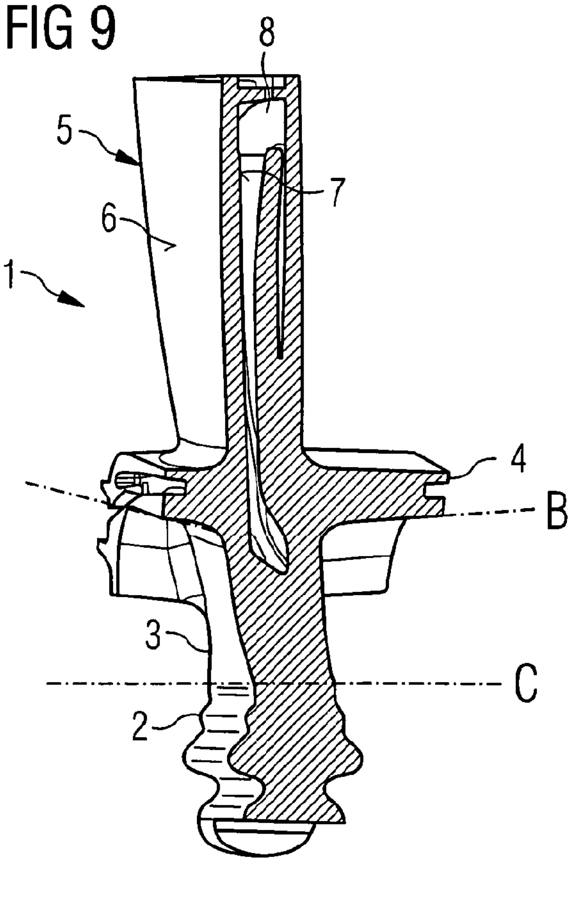
FIG. 9 is a cross sectional view taken along line IX-IX in FIG. 7.

The distribution of the three different coatings on the blade 1 is also indicated in FIG. 5. A dotted line represents the first, a dashed line (short dash) the second and a dashed line (long dash) the third coating.

In order to produce the coated turbine blade 1 in a first step all outer and inner surfaces of the blade 1 are diffusion coated with Cr by chemical vapour deposition.

It is also possible to mask certain parts of the component especially the parts which shall be coated afterwards with a MCrAlY coating prior to the application of the first coating using masking elements and techniques already know in the art. In this case the masked parts of the component will not be coated with the first coating.

In a second step MCrAlY as the second coating is applied to the neck 3, the outer surface 6 of the airfoil 5 and on the whole of the platform 4 to cover the first coating by high velocity ox-fuel spraying. Other thermal spraying techniques are also possible. It is important to use suitable masking elements to prevent stray deposition on parts of the blade 1 which shall not be coated with the second coating.

Finally the third coating in the form of the Al modified Cr coating is applied. For this purpose Al is diffused by chemical vapour deposition into the already chromized (the first coating) inner surface 7 of the airfoil 5. This yields the outer beta layer of the desired composition.

FIGS. 6 to 10 show another turbine blade 1 also having a root 2, a neck 3, a platform 4 and an airfoil 5 with an outer surface 6 and an inner surface 7. In this case the turbine blade 1 consists of the superalloy IN6203 and is provided by conventional casting techniques.

A first diffusion Cr coating is present on all outer and inner surfaces of the blade 1. It is between 5 to 25 μm thick and comprises of 15 to 30 weight-% Cr.

A second coating is provided on top of the first coating in selected regions, namely on the outer and the inner surface (6,7) of the airfoil 5 and on the whole of the platform 4. The second coating is a Al modified Cr coating which has an outer beta layer with a composition of 15 to 30 weight-% Al and 5 to 15 weight-% Cr. The border between the portion of the blade 1 which is provided with the second coating and the neck 3 which does not have the second coating is indicated by the dotted line B.

A third coating comprising MCrAlY covers the first coating on the neck 3 between line B and the root 2, the border being indicated by dotted line C. The third coating has the following composition: 30 to 70 weight-% Ni, 30 to 50 weight-% Co, 15 to 25 weight-% Cr, 5 to 15 weight-% Al and up to 1 weight-% Y.

The third MCrAlY coating can also have the following composition: 10 to 40 weight-% Cr, 5 to 35 Al, 0 to 2 weight-% Y, 0 to 7 weight-% Si, 0 to 2 Hf and balance primarily Ni and/or Co with all other elemental additions comprising <20 weight-% of the total, preferably 20 to 40 weight-% Cr, 5 to 20 Al, 0 to 1 weight-% Y, 0 to 2 weight-% Si, 0 to 1 Hf and balance primarily Ni and/or Co with all other elemental additions comprising <20 weight-% of the total, more preferably 25 to 40 weight-% Cr, 5 to 15 Al, 0 to 0.8 weight-% Y, 0 to 0.5 weight-% Si, 0 to 0.4 Hf and balance primarily Ni and/or Co with all other elemental additions comprising <20 weight-% of the total.

Figure 10:
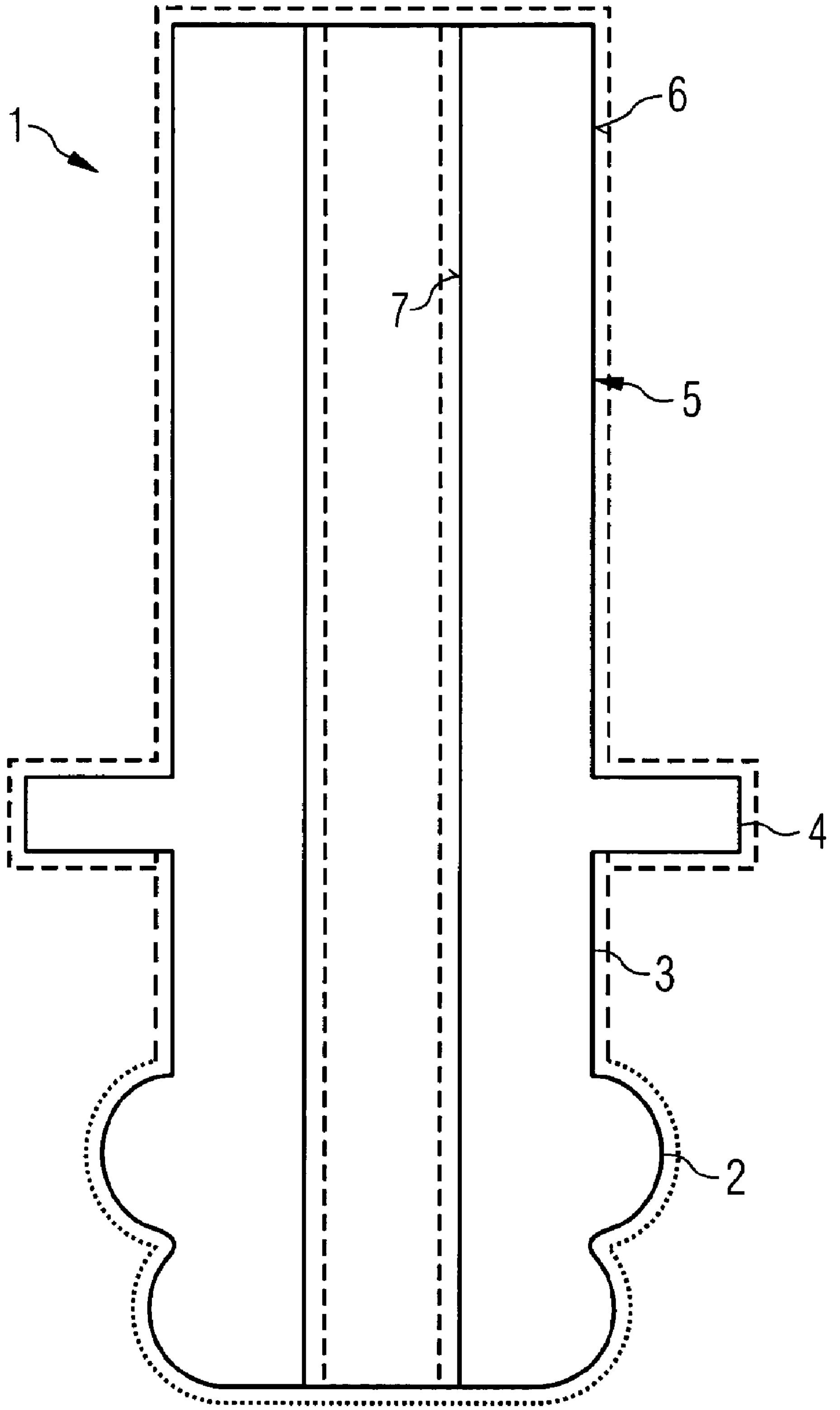
FIG. 10 is schematic view of the turbine blade shown in FIG. 6.
Figure 11:
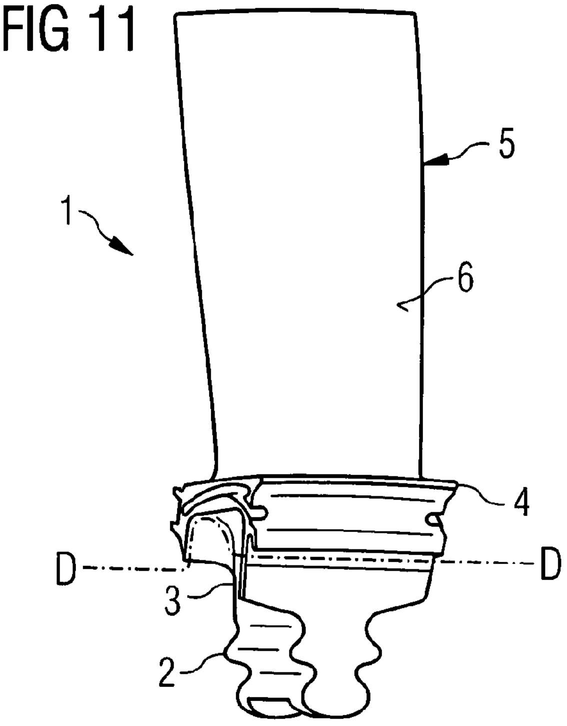
FIG. 11 is a perspective view of a turbine blade according to a third embodiment of the present invention.
Figure 12:
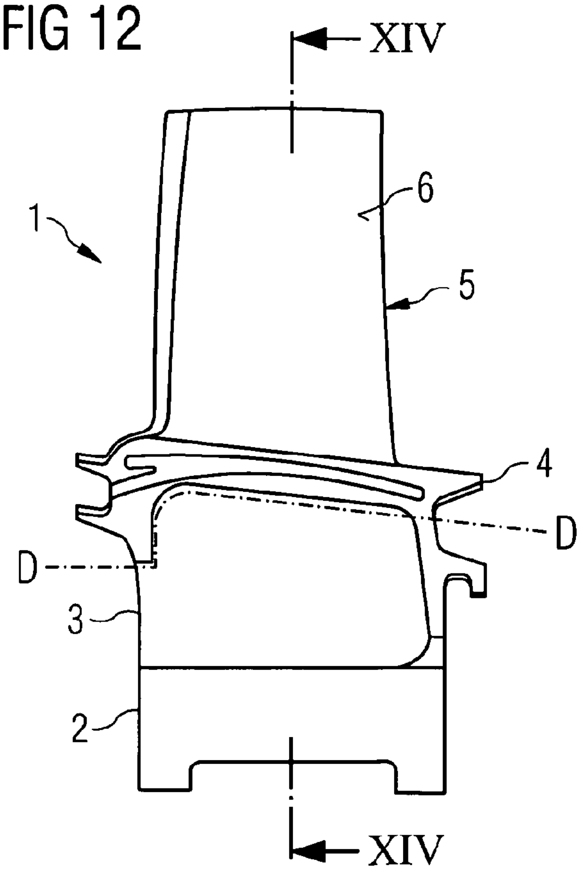
FIG. 12 is a side view of the turbine blade shown in FIG. 11.
Figure 13:
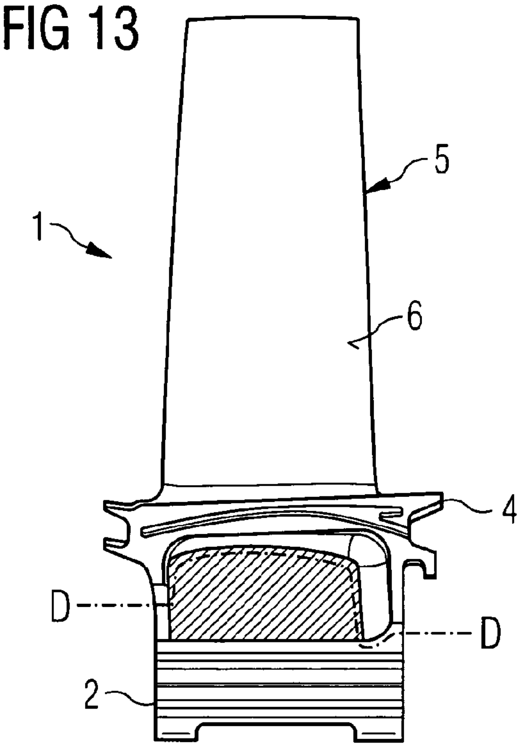
FIG. 13 is a longitudinal sectional view of the turbine blade shown in FIG. 12
Figure 14:
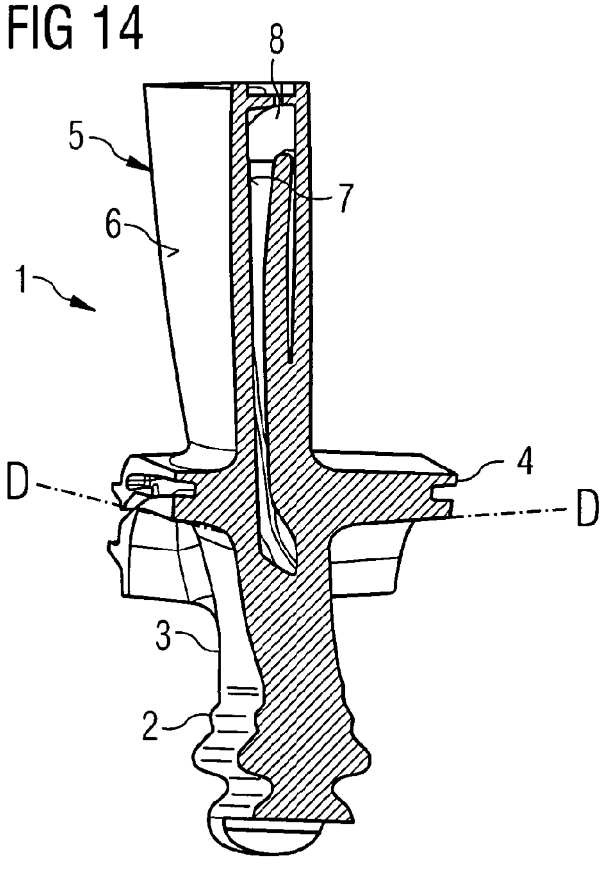
FIG. 14 is a cross sectional view taken along line XIV-XIV in FIG. 12.

The distribution of the three different coatings on the blade 1 is also indicated in FIG. 10. A dotted line represents the first, a dashed line (long dash) the second and a dashed line (short dash) the third coating.

In order to produce the coated turbine blade 1 in a first step all outer and inner surfaces of the blade 1 are diffusion coated with Cr by pack cementation.

It is also possible to mask certain parts of the component especially the parts which shall be coated afterwards with a MCrAlY coating prior to the application of the first coating using masking elements and techniques already know in the art. In this case the masked parts of the component will not be coated with the first coating.

In a second step the second coating in the form of the Al modified Cr coating is prepared by diffusing Al into the already chromized (the first coating) outer and inner surface 6,7 of the airfoil 5 and the whole of the platform. This yields the outer beta layer of the desired composition.

Finally the MCrAlY as the third coating is applied to the first coating on the neck 3 by vacuum plasma spraying. It is important to use suitable masking elements to prevent stray deposition on parts of the blade 1 which shall not be coated with the third coating.

FIGS. 11 to 15 show a third turbine blade 1 having a root 2, a neck 3, a platform 4 and an airfoil 5 with an outer surface 6 and an inner surface 7. In this case the turbine blade 1 consists of the superalloy CMSX4 and is provided by directionally solidified casting techniques. The root 2 is connected with the neck 3 which carries the platform 4. The airfoil 5 extends from the platform 4. Inside the airfoil 5 the inner surface 7 defines at least one cooling passage 8 which is depicted in FIG. 4.

A first diffusion Cr coating is present on the root 2, the neck 3 and on the inner surface 7 of the airfoil 5. It is about 5 to 25 μm thick and comprises of 15 to 30 weight-% Cr.

A second MCrAlY coating is provided in restricted parts of the blade 1 only, namely on the outer surface 6 of the airfoil 5 and on the top face and the side of the platform 4. The coating has a composition of 30 to 70 weight-% Ni, 30 to 50 weight-% Co, 15 to 25 weight-% Cr, 5 to 15 weight-% Al and up to 1 weight-% Y.

The second MCrAlY coating can also have the following composition: 10 to 40 weight-% Cr, 5 to 35 Al, 0 to 2 weight-% Y, 0 to 7 weight-% Si, 0 to 2 Hf and balance primarily Ni and/or Co with all other elemental additions comprising <20 weight-% of the total, preferably 20 to 40 weight-% Cr, 5 to 20 Al, 0 to 1 weight-% Y, 0 to 2 weight-% Si, 0 to 1 Hf and balance primarily Ni and/or Co with all other elemental additions comprising <20 weight-% of the total, more preferably 25 to 40 weight-% Cr, 5 to 15 Al, 0 to 0.8 weight-% Y, 0 to 0.5 weight-% Si, 0 to 0.4 Hf and balance primarily Ni and/or Co with all other elemental additions comprising <20 weight-% of the total.

The border between the portion of the blade 1 which is provided with the second coating and the portions of the platform 4 which do not carry the coating is indicated by the dotted line D.

A third coating covers the second coating completely. It is provided on the outer surface 7 of the airfoil 5 and on the top face and the side face of the platform 4. The third coating comprises Al which was overaluminised. The second coating has in its outer surface a content of between 15 to 30 weight-% Al.

Figure 15:
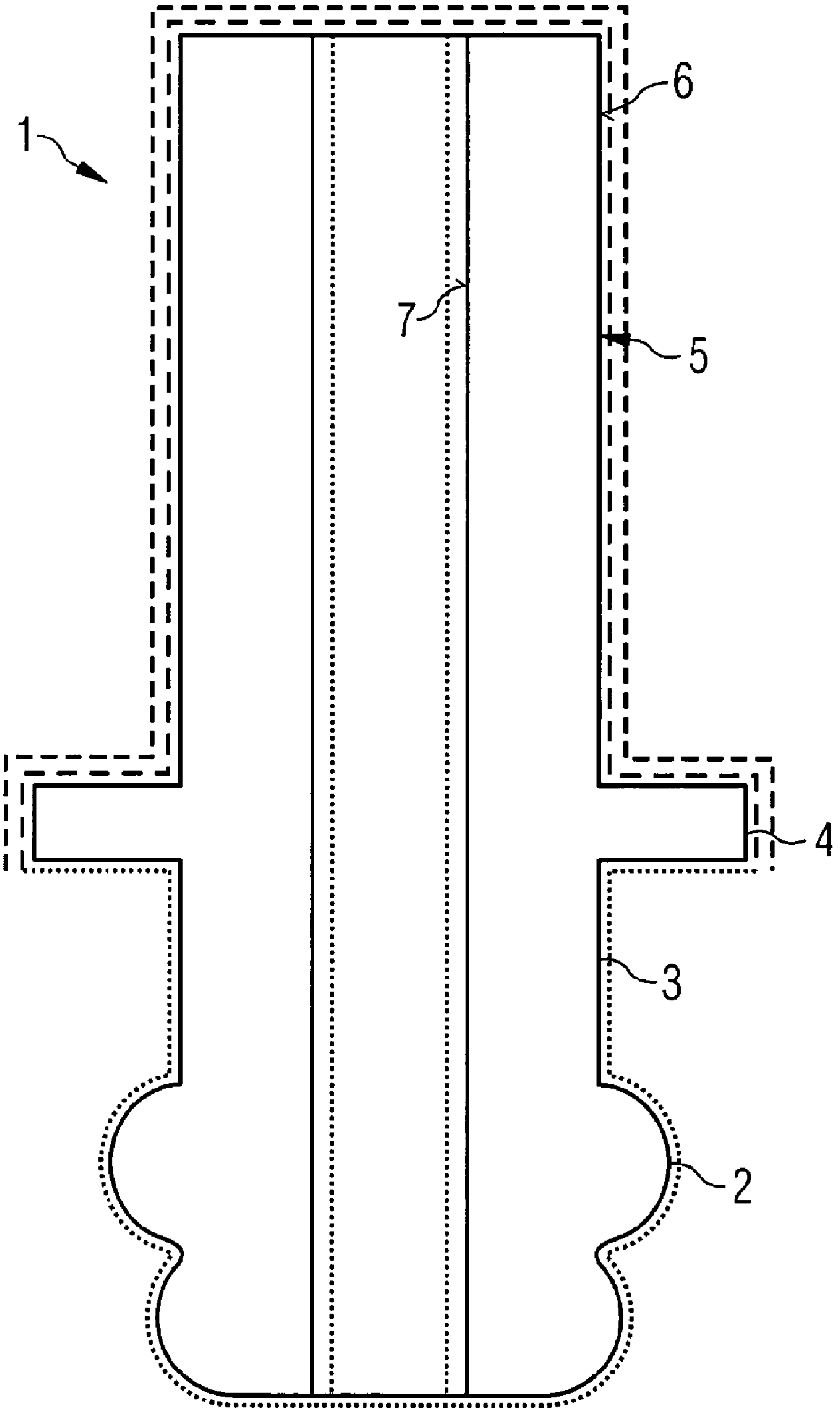
FIG. 15 is schematic view of the turbine blade shown in FIG. 11.

The distribution of the three different coatings on the blade 1 is also indicated in FIG. 15. A dotted line represents the first, a dashed line (short dash) the second and a dashed line (long dash) the third coating.

In order to produce the coated turbine blade 1 in a first step the inner surface 7 of the airfoil 5, the neck 3 and the root 2 of the blade 1 are diffusion coated with Cr by chemical vapour deposition. The other parts of the blade 1 are protected from being coated by suitable masking elements.

In a second step MCrAlY as the second coating is applied to the outer surface 6 of the airfoil 5 and on the top face and/or the side face of the platform 4 by high velocity ox-fuel spraying. Other thermal spraying techniques are also possible. It is important to use suitable masking elements to prevent stray deposition on parts of the blade 1 which shall not be coated with the second coating.

Finally the third coating is applied on top of the second coating. For this purpose Al is overaluminised by chemical vapour on the outer surface 6 of the airfoil 5 and on the top face and/or the side face of the platform 4. This yields the outer surface of the second surface with an Al content of between 15 to 30 weight-%.

It is to be noted, that in the two described embodiments the turbine blades 1 are provided with the second and third coatings only in selected regions, whereas the reminder of the blade 1 is coated with a chromium diffusion coating alone which is strain tolerant, and that the strain tolerance of this coating is not degraded by the application of the second and third coatings.

The invention claimed is:

1. A turbine component, comprising:

a root;

a neck;

a platform;

an airfoil; and an outer surface and an inner surface in the airfoil defining cooling passages therethrough;

a first coating on outer surfaces of the root and neck and inner surface of airfoil;

a second coating on at least a portion of the first coating covering an area of the component;

a third coating on at least a portion of the first coating not covered by the second coating; and, wherein the first, second and third coatings differ in composition from each other, wherein the second coating is provided on at least a portion of the first coating on the neck, and wherein a third coating is provided on at least a portion of the first coating on the inner surface of the airfoil, the first, the second and the third coating being different in their composition, and wherein the second coating also is provided on at least a portion of the first coating on the outer surface of the airfoil and on the first coating on at least a part of the platform.

2. The turbine component as claimed in claim 1, wherein the first coating comprises Cr and the Cr of the first coating is diffused into the component.

3. The turbine component as claimed in claim 2, wherein the Cr of the first coating is diffused by pack cementation or by chemical vapour deposition (CVD).

4. The turbine component as claimed in claim 2, wherein the first coating is a layer comprising 15 to 30 weight-% Cr or being 5 to 25 μm thick.

5. The turbine component as claimed in claim 1, wherein the second coating comprises MCrAlY, M being Co or Ni or both.

6. The turbine component as claimed in claim 5, wherein the second coating further comprises Re, Si, Hf or Y.

7. The turbine component as claimed in claim 5, wherein the second coating has a composition of 30 to 70 weight-% Ni, 30 to 50 weight-% Co, 15 to 25 weight-% Cr, 5 to 15 weight-% Al, and up to 1 weight-% Y.

8. The turbine component as claimed in claim 1, wherein the second coating is applied by thermal spray techniques such as a vacuum plasma spraying (VPS), low pressure plasma spraying (LPPS), high velocity ox-fuel spraying (HVOF), cold gas spraying (CGS) or by electroplating.

9. The turbine component as claimed in claim 1, wherein the third coating comprises Cr and Al, the third coating is a Al modified Cr coating, and the third coating is provided by diffusing Al into a chromized surface.

10. The turbine component as claimed in claim 9, wherein the Al is diffused into the chromized surface by CVD or other methods such as above the pack (ATP).

11. The turbine component as claimed in claim 9, wherein the third coating has a composition in an outer beta layer of between 15 to 30 weight-% Al and 5 to 15 weight-% Cr.

12. A turbine component, comprising:

a root;

a neck;

a platform;

an airfoil; and an outer surface and an inner surface in the airfoil defining cooling passages therethrough:

a first coating on outer surfaces of the root and neck and inner surface of airfoil;

a second coating on at least a portion of the first coating covering an area of the component;

a third coating on at least a portion of the first coating not covered by the second coating; and, wherein the first, second and third coatings differ in composition from each other, and wherein the first coating is also on the outer surface of the airfoil and the second coating is provided on at least a portion of the first coating on the inner and on the outer surface of the airfoil and on at least a portion of the first coating on at least a part of the platform, the first and the second coating differing in their composition.

13. The turbine component as claimed in claim 12, wherein the third coating is provided on at least a portion of the first coating on the neck, the first, the second and the third coating differing in their composition.

* * * * *